Figure 1:
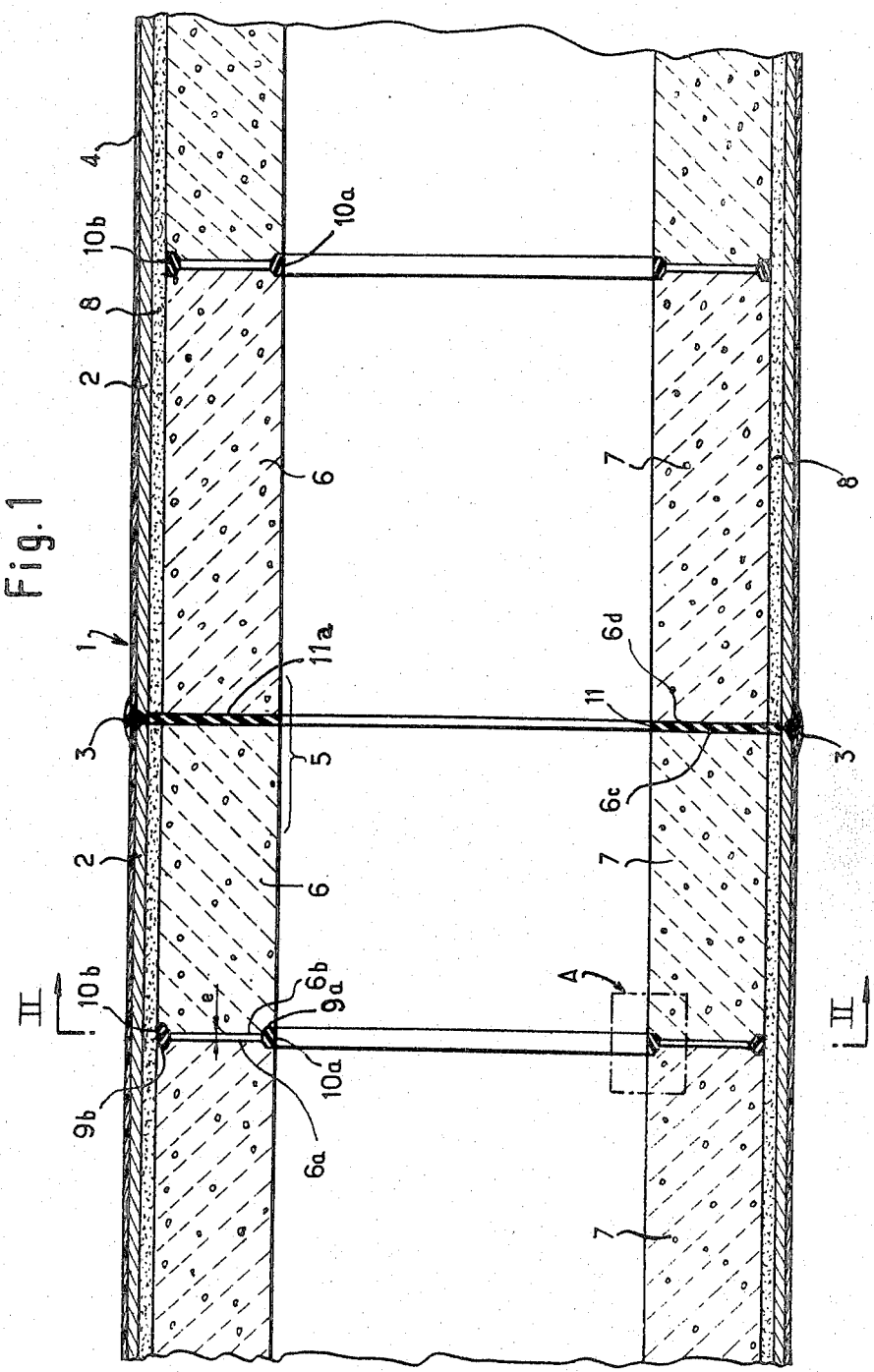

United States Patent [19]

Chabrier

[11] 4,371,197
[45] Feb. 1, 1983

[54] PIPELINE FOR CONVEYING HOT OR COLD FLUIDS

[75] Inventor: Gilbert Chabrier, Montmorency, France

[73] Assignee: Spie-Batignolles, Puteaux, France

[21] Appl. No.: 217,181

[22] Filed: Dec. 16, 1980

[30] Foreign Application Priority Data

Dec. 27, 1979 [FR] France ............................. 79 31780

[51] Int. Cl.³ .................... F16L 11/12; F16L 35/00; F16L 9/22
[52] U.S. Cl. ................................. 285/47; 285/334.3; 285/337; 285/133 R; 285/138; 138/155; 138/175; 138/149
[58] Field of Search ..................... 285/47, 48, 41, 55, 285/50, 53, 334.3, 297, 337, 138, 133 R; 138/155, 175, 149, 113

[56] References Cited

U.S. PATENT DOCUMENTS

| | | | |
|---|---|---|---|
| 3,040,760 | 6/1962 | Macks | 285/55 X |
| 3,282,301 | 11/1966 | Ligon | 138/175 |
| 3,467,410 | 9/1969 | Chandler | 285/55 |
| 3,861,722 | 1/1975 | Kenyon | 285/337 |
| 3,917,285 | 11/1975 | Owanson et al. | 285/53 X |
| 4,241,762 | 12/1980 | Link et al. | 138/175 X |

FOREIGN PATENT DOCUMENTS

| | | | |
|---|---|---|---|
| 1319596 | 6/1973 | United Kingdom | 285/337 |
| 1480707 | 7/1977 | United Kingdom | 285/55 |

Primary Examiner—Richard J. Scanlan, Jr.
Attorney, Agent, or Firm—Young & Thompson

[57] ABSTRACT

The pipeline for the conveying of hot or cold fluids comprises metallic and rigid tubes (2) which are assembled directly end to end, a covering (5) of heat-insulating material in the form of sleeves (6) which are made on the basis of a cement filled with thermically insulating inorganic particles, with said covering (5) being disposed inside said tubes (2) and being in direct contact with the fluid conveyed by the pipeline.

The thickness of the covering (5) made of heat-insulating material is determined in such a way that the expansion or contraction of the tubes (2) upon the feeding of hot or cold fluid into the pipeline remains compatible with the mechanical resistance of the tubes and that the outer diameter of the sleeves (6) is slightly smaller than the interior diameter of the tubes (2), with the annular space between said tubes (2) and said sleeves (6) being filled by a sealing material (8) which is injected under pressure and is more elastic than the material of the sleeves.

Application especially for conveying hot water, crude oil and cooled or liquefied gas at low temperatures.

3 Claims, 6 Drawing Figures

PIPELINE FOR CONVEYING HOT OR COLD FLUIDS

The present invention relates to a pipeline for conveying hot or cold fluids such as hot heating water, heated crude oil or cooled or liquefied gas at low temperatures.

It is known that the conveying of hot or cold fluids poses considerable problems with respect to the construction of pipelines carrying such fluids. Pipelines of this type require mainly an efficient heat insulation to avoid loss of heat or cold of the conveyed fluid toward the outside.

Besides, when pipelines are put into operation they are subjected to strain due to expansion or contraction resulting from temperature variations.

To resolve these problems, it is customary to use pipelines of steel which are heat-insulated at the outside and comprise compensating means for expansion such as bellows or expansion bends. The production of such pipelines is complex and costly. Furthermore, it is difficult to convey therein hot or cold fluids over long distances and to lay them into trenches. In other respects these pipelines require a resistant and tight protective outer cover which is heat-insulating. This resistant and tight cover is expensive and does not allow the cathodic protection of pipelines of steel.

To obviate these drawbacks, pipelines have been designed which are of a nickel-steel alloy (Invar), having a small expansion coefficient which makes the use of compensating means against expansion and contraction unnecessary. The use of the alloy Invar is, however, limited to temperatures below about 200° C. for the reason that its expansion coefficient increases considerably thereabove.

Further, the cost of the alloy Invar is very high and has prevented up to now its industrial utilization for pipelines with strong lengths provided for conveying hot or cold fluids over long distances.

The pipeline for the conveying of hot or cold liquids according to the invention consists of a metallic outer cover comprising rigid tubes which are directly assembled end to end, for example by welding, and containing a heat-insulating covering directly in contact with the conveyed fluid.

The pipeline described in the European patent application No. 497 (Jülich) relates to this definition but has among others the drawback of providing for only a slight tightness between the outer envelope and the fluid.

Other pipelines, like, for example, the one set forth in French Pat. No. 2 170 328 (CEA), concerns a pipeline embedded in a bed of concrete having, contrary to the invention, a free insulating space between the metallic cover and the heat-insulating material.

In the U.S. Pat. No. 1,714,948 (Coffin) the pipeline disclosed therein provides for the circulation of a cooling fluid between the outer metallic cover and the insulating coating.

The main problem to be solved by the present invention is to find an economical and reliable solution for internally heat-insulating a pipeline of such material that the outer metallic tubes can be welded end to end and do not require bellows, expansion bends or the like, nor any means for anchoring of the pipeline in the ground.

According to the invention, the pipeline for conveying hot or cold fluids comprises metallic rigid tubes which are assembled directly end to end, a covering of heat-insulating material consisting of sleeves, made of cement filled with inorganic particles which are thermically insulating, said covering being arranged inside said tubes and in direct contact with the fluids conveyed by the pipeline. Said pipeline is being characterized in that the thickness of the covering of heat-insulating material is determined in such a way that the expansion or contraction of the tubes upon feeding the hot or cold fluid into the pipeline remains compatible with the mechanical resistance of the tubes, and in that the outer diameter of the sleeves is slightly smaller than the inner diameter of the tubes, with the annular space between the latter and the sleeves being filled with a sealing material, injected therein under pressure and which is more elastic than the sleeve material.

Thus, according to the invention one starts with a material known as such, based on cement filled with insulating particles and molded in form of sleeves. Such a material resists pressure and can be put in direct contact with the fluid conveyed by the pipeline since the material is tight.

The solution set forth above comprises two parts. The first part discloses the means (thickness of insulating material) which are needed for limiting, to an admissible degree, the longitudinal strains in the outer tubes. These means, however, are not sufficient to solve the problem of the invention completely. Indeed, there is the delicate problem of placing the sleeves of insulating material inside the tubes, to fix them therein and to adapt the mechanical resistance of the sleeves to the mechanical and thermic strains to which they are to be subjected. This difficulty is overcome by the second feature of the solution disclosed above.

The sealing material in question facilitates considerably the insertion and fixing of the sleeves in the tubes. This material therefore plays the following important part: on the one hand it renders the insulating sleeves integral with the metallic tubes in absorbing the contraction of said sleeves and, on the other hand, it allows a hooping effect of the sleeves, in that the internal strain due to expansion and pressure is transmitted to the outer tubes.

According to a preferred embodiment of the invention the covering is made of prefabricated sleeves which are separated from each other by elastic sealing joints which are resistant to the temperature of the fluid.

These joints of expansion collect the strains due to the longitudinal expansion of the sleeves.

Other features and advantages of the invention appear in the following description.

Figure 2:
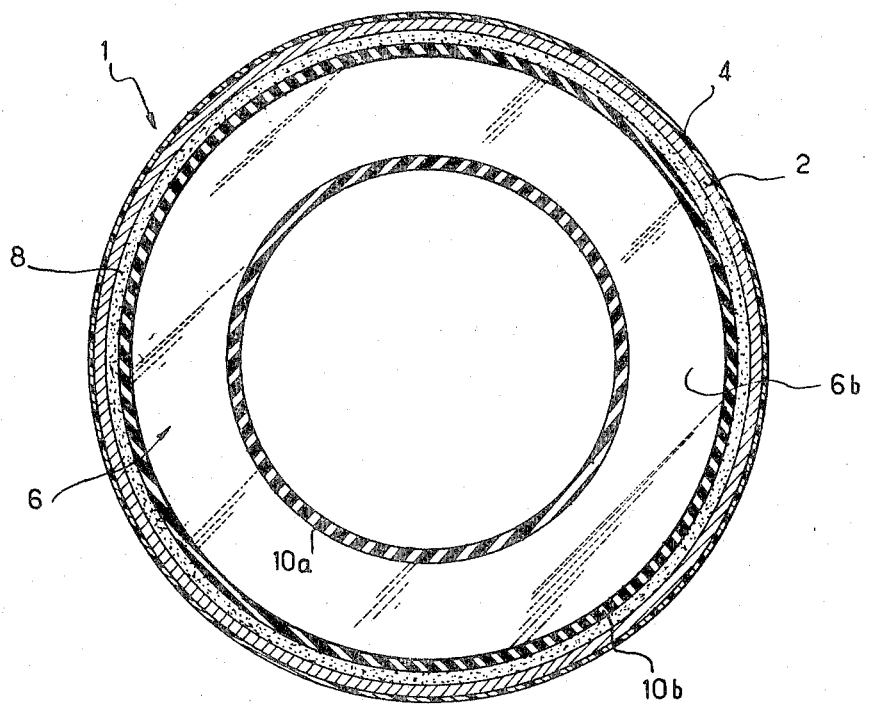
Figure 3:
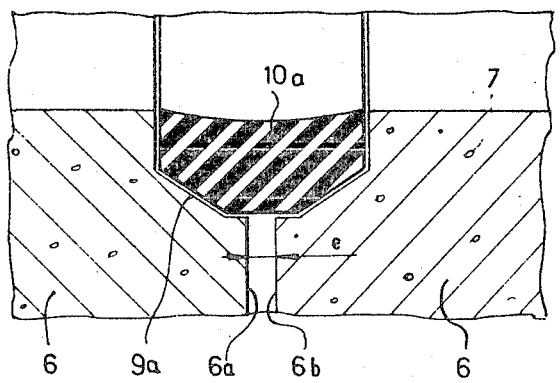
Figure 4:
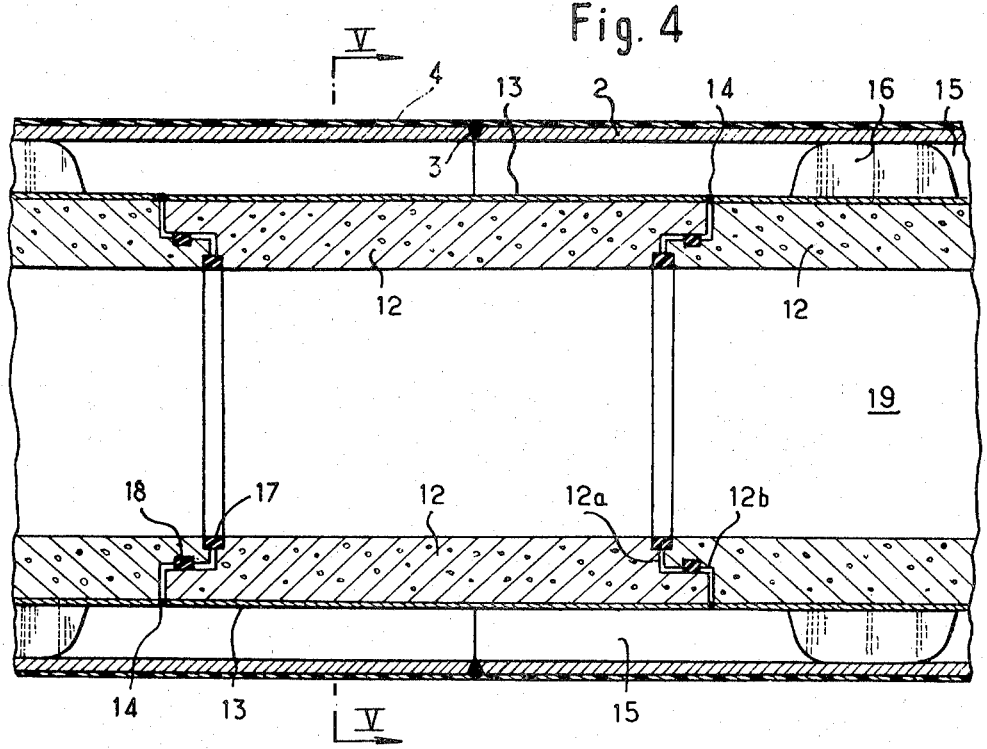
Figure 5:
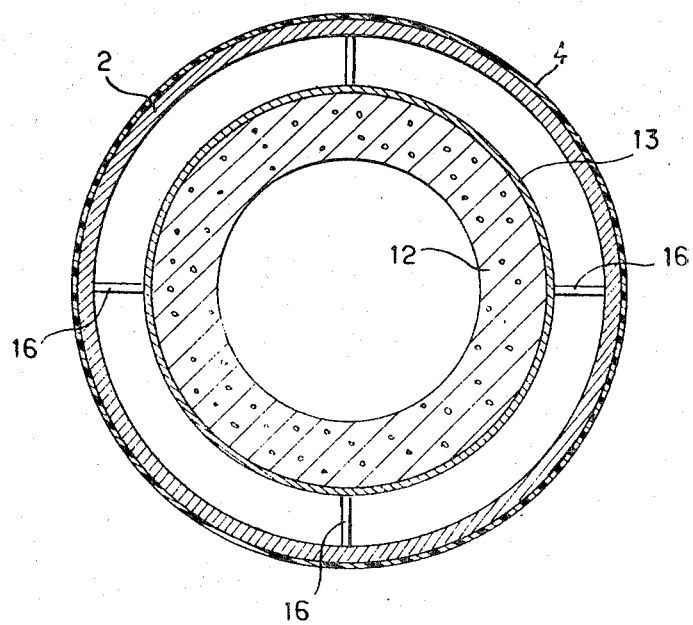
Figure 6:
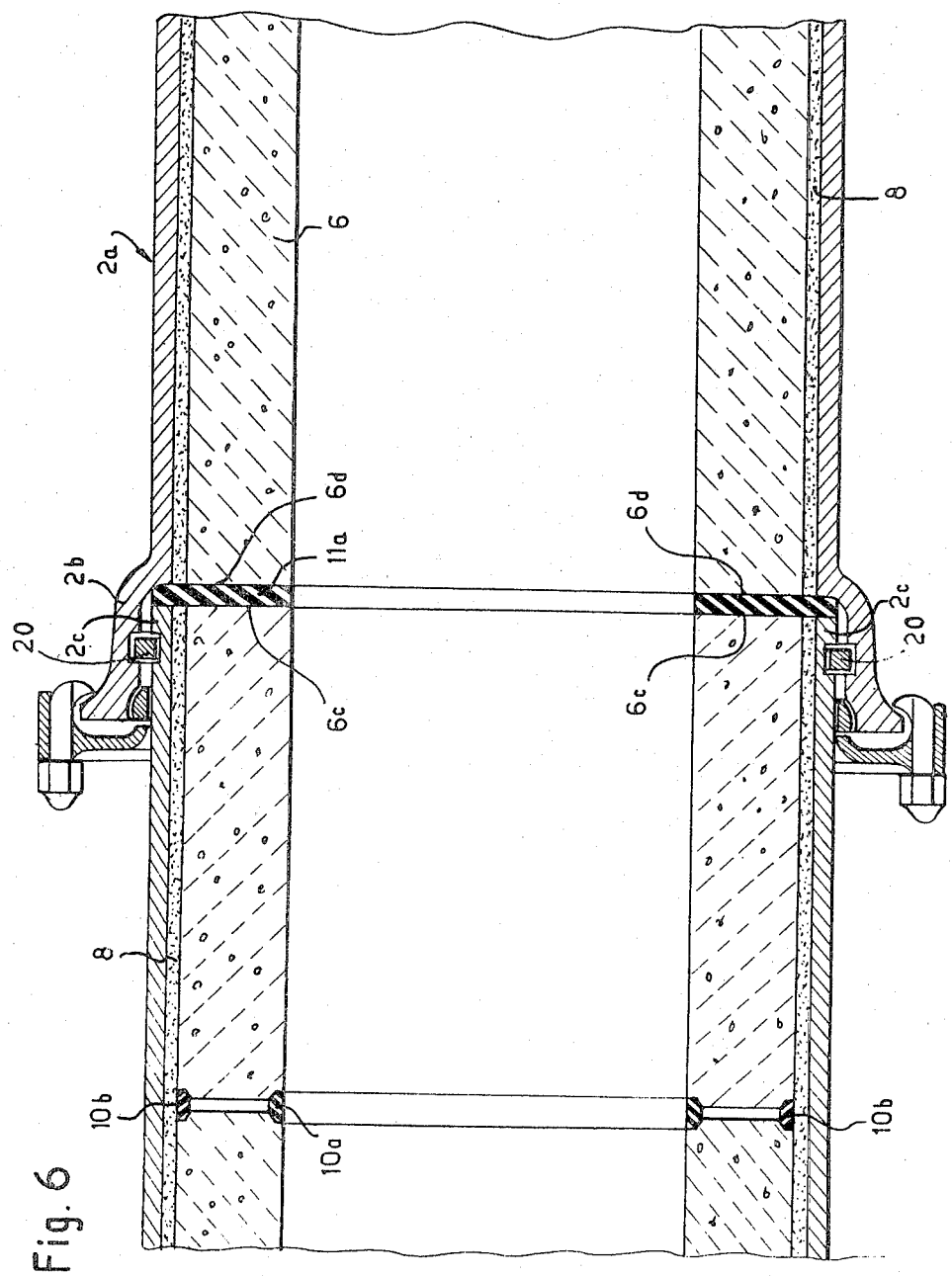

In the attached drawings which serve only as examples and do not limit the invention:

FIG. 1 is a longitudinal sectional view of a pipeline according to the invention, FIG. 2 is a view in section following the plane II—II in FIG. 1, FIG. 3 is a view on a large scale of the detail A of FIG. 1, FIG. 4 is a longitudinal section of another embodiment of the pipeline according to the invention, FIG. 5 is a sectional view following the plane V—V of FIG. 4, FIG. 6 is a longitudinal section of the pipeline according to the invention in ductile cast iron.

In the embodiments of FIGS. 1 and 2, the pipeline is, for example, intended to be embedded for conveying hot heating water over 30 to 40 km, with the water being at 110°–120° C., under pressure of 25 bars and a volume corresponding to 150 000 Th/h.

The pipeline 1 is composed of tubes 2 of ordinary steel, directly assembled end to end on the site by welds 3. Said tubes 2 are protected at the outside by a layer 4 of a known anti-corrosive coating.

The steel tubes 2 comprise at their inside a heat-insulating covering 5 formed of prefabricated sleeves 6 of heat-insulating material. Said tubes 2 constitute hooping means for the heat-insulating coverings 5. This heat-insulating material is, for example, formed by a refractory aluminous cement, enclosing expanded glass balls 7. These expanded glass balls 7 can, if desired, be mixed with grains of perlite, hollow spheres of silica or other materials which are heat-resistant.

Said expanded glass balls 7 or the thermic insulating particles cited before give to the covering 5 a heat-insulating strength which is relatively high for a material based on cement. Thus, when the heat-insulating covering 5 encloses about 30% in weight of expanded glass balls 7, its coefficient of thermic transmission $\lambda$ is equal to 0.3 kcal/m/h/° C. In the case of an aluminous cement not filled with expanded glass balls, the coefficient is superior to 1.3.

The binder in the aluminous cement of the heat-insulating covering 5 gives the latter a high resistance to the forces of pressure applied by the fluid as well as excellent resistance to abrasion caused by the passing of the fluid.

The thickness of the heat-insulating covering 5 is determined in such a way that the temperature of ordinary steel tubes 2 does not exceed 60° C., regardless of the type of terrain traversed by the pipeline.

Consequently, when the pipeline 1 is put into service, i.e. when hot water is introduced therein, the expansion of the tubes 2 under the effect of their increase in temperature from the surrounding temperature remains negligible, and the resulting mechanical strain stays below the admissible strain, taking into account the mechanical resistance of the tubes 2.

Thus, the pipeline 1 can be embedded without special precaution and, in particular, without any anchoring means, support means and compensators like bellows or expansion bends.

In FIGS. 1 and 2 it can be seen that the exterior diameter of the sleeves 6 is slightly smaller than the inner diameter of the steel tubes 2. The annular space between the tubes 2 and the sleeves 6 is filled with a resilient sealing material 8. This sealing material 8 is more elastic than the heat-insulating cover 5. Said sealing material 8 can, for example, be a relatively pliable plastic material like polyvinyl chloride or a cement on the basis of latex.

The sealing material 8 plays an important part: on the one hand it renders the sleeves 6 integral with the steel tubes 2 in absorbing the contraction of the latter, and, on the other hand, it allows a heat-insulating hooping effect where the internal strains, due to expansion and pressure, are transmitted to the steel tubes 2. In the case of cold fluids a heat-insulating pre-strain can be carried by said sealing means 8 at the time of injection (done at high pressure) in such a way as to compensate for the contraction of the insulating material under the effect of the cold and thus to suppress the internal strains.

As a result of its greater elasticity than that of the sleeves 6, the material 8 also absorbs the differentials of expansion between the sleeves 6 and the tubes 2, as well as the mechanical shocks which may be applied against the outside of the tubes 2.

It can further be seen in FIG. 1 that a play *e* exists between the adjacent ends 6a, 6b of the sleeves 6, in such a manner as to allow the longitudinal expansion of said sleeves 6. Furthermore, the adjacent ends 6a, 6b of the sleeves 6 carry on their inner and outer edges (see FIG. 3) shoulders 9a and 9b which define annular seats wherein sealing and expansion joints 10a and 10b are inserted. These joints 10a and 10b are made of an elastic material with a chemical resistance against the fluid and its temperature, like, for example, an elastomer on the basis of silica or an elastomer mixed with asbestos fibers.

On the level of the welds 3 which join the steel tubes 2, a flat joint 11 is arranged between the cut ends 6c, 6d of the sleeves 6. Said flat joint 11 is preferably an elastomer filled with asbestos.

To build the pipeline 1 as described, the following method is used:

After having prefabricated the sleeves 6, they are inserted into a steel tube 2, while placing joints 10a and 10b between each sleeve 6 and by leaving a slight overlap at each end of the tube 2.

The placing of the sleeves 6 into the tube 2 does not cause any difficulties, due to the annular play between the sleeves 6 and the tube 2 and which takes into account the manufacturing tolerances of the tubes 2 and the sleeves 6.

After the centering of the units of the sleeves 6 in the tube 2 and the filling of the annular space at the ends, the elastic sealing material 8 is injected.

Once the sealing material 8 is in place, the ends are adjusted to the length of the tube 2.

The tubes 2 thus prepared are thereafter taken to the site where they are welded end to end, while interposing between the faces 6c and 6d of the sleeves 6 a flat joint 11, the thickness of which is equal to that of the gap needed for welding. The contraction upon welding has the result of compressing the joint. In some cases where a greater tightness is needed, a cold-vulcanized elastomer is put in at 11a prior to laying the tubes 2 end to end.

The setting up of a pipeline according to the invention is easy and does not require any special precaution once it is in service. As a result of the thermic insulation effected by the inner heat-insulating covering 5, the tubes 2 are submitted to strains which are perfectly compatible with the regular resistance of the said tubes.

The numerical characteristics of a pipeline according to FIG. 1 for conveying 150 000 Th/h with water at 120° C. and being embedded in the ground having a median temperature of 10° C., are now given in form of an example which is non-limitative.

Tubes 2: outer diameter 812.8 mm, thickness 6 mm.
Elastic sealing material 8: polyvinyl chloride, thickness 10 mm.
Heat-insulating covering 5: aluminous cement filled with expanded glass balls (Expanver), thickness 11.5 cm.
Coefficient of thermic insulation of soil: 1.5 kcal/m/h/° C.
Depth of embedding of pipeline 1: 1.206 m.

The detailed composition of the concrete used in this example for making the heat-insulating covering 5 is as follows:

Expanded glass balls of 6 to 8 mm diameter, 100 kg.
Expanded glass balls of 1 to 2 mm diameter, 111 kg.
Spheres of hollow silica of 20 to 200 microns diameter: 133 kg. melted aluminous cement: 333 kg.
Water: 180 liter.

In this example the temperature of the steel tubes 2 is maintained during operation at 61° C. The thermic losses are thus reduced to 272 Th/h/km.

In the embodiment according to FIGS. 4 and 5 the heat-insulating covering 12 is arranged at the inside of the sleeves 13, made of ordinary steel and assembled end to end by welds 14. The sleeves 13 are separated from exterior steel tubes 2 by an annular space 15.

The centering of the sleeves 13 which carry the heat-insulating covering 12, is attained by means of supports 16 which are radially fixed on the periphery of the steel sleeves 13.

In the embodiment as shown, the adjacent ends 12a, 12b of the sleeves forming the inner heat-insulating covering 12 are enclosed, the ones inside the others, with tightness being obtained by means of annular joints 18, 17 of elastomer.

The pipeline shown in FIGS. 4 and 5 comprises two concentric compartments 19 and 15. The inner compartment 19 is designed for the conveying of a hot or cold fluid, for example of hot water as is the case in the embodiment of FIGS. 1 and 2.

The inner heat-insulating covering 12 assures, as before, the thermic insulation toward the outside and the keeping in place of the steel sleeves 13 as well as maintaining the outer tubes 2 at an inferior temperature when the critical strains in the latter begin to appear.

The outer annular space or compartment 15 allows the conveying of a fluid at a temperature lower than that of the fluid contained in the inner compartment 19.

In a preferred embodiment of the invention, the outer compartment 15 allows the return of the cold water, after the hot water which has been conveyed into the inner compartment 19 has exchanged its heat in any suitable heating device.

It is stressed that the invention is not limited to the examples of the embodiments given before and that numerous other modifications can be devised within the boundaries of the invention.

With the pipeline according to the invention all hot fluids up to a temperature exceeding 400° C. can be conveyed.

The pipeline according to the invention can also be used for conveying cold fluids like natural gas cooled to −70° C.

In this case, as well as in the case where the temperature of the fluid does not exceed +200° C., the binder in the inner heat-insulating covering is preferably a suitable resin, like polyvinyl chloride, epoxy resin or elastomer.

In the following, a non-limitative example of a heat-insulating covering using a binder on the basis of epoxy resin is given.

Hollow spheres of silica type "Regisphere": 200 kg.
Perlite, 1 mm diameter: 75 kg.
Epoxy resin (Araldite E): 183 kg.
Hardener HY 842: 91.5 kg.

The covering thus obtained offers a resistance to a compression of 78 bar and a coefficient of thermic transmission λ of 0.15 kcal/m/h/° C.

The outer tubes 2 of the pipeline according to the invention are not in contact with the conveyed fluid and can be made of ordinary steel. This represents considerable savings in the case of very low or very high temperatures where, as a rule, special alloyed steel is needed.

In the case of under-water lines at great depth, the application of a heat-insulating resisting agent against pressure at the inside of the steel tubes 2 allows considerable savings with respect to the thickness of the tubes, considering that an important part of the pressure is kept by the heat-insulating covering in such a way that the latter acts at the same time as a permanent relieving element of the pipeline.

In the embodiment shown in FIG. 6, a pipeline according to the invention is shown in which the outer tubes 2a are made of ductile cast iron. The ends 2b and 2c of these tubes 2a are encased, the ones in the others, and locked together by locking means 20. The flat joint 11a is arranged between the ends 2b and 2c.

I claim:

1. In a pipeline for conveying hot or cold fluids having metallic and rigid tubes (2), assembled directly end to end, a covering (5) of heat-insulating material formed as sleeves (6) made on the basis of a cement filled with thermically insulating inorganic particles, with said covering being disposed at the interior of said tubes (2) and in direct contact with the fluid conveyed by the pipeline, the improvement comprising: a thickness of said covering (5) of heat-insulating material which is determined in such a way that the expansion or contraction of the tubes (2) upon the introduction of a hot or cold fluid remains compatible in said pipeline with the mechanical resistance of the tubes, and an outer diameter of the sleeves (6) of slightly smaller size than the inner diameter of the tubes (2), with the annular space between said tubes (2) and said sleeves (6) being filled by a sealing material (8), injected under pressure, and being more elastic than the material of the sleeves.

2. The pipeline as defined in claim 1, wherein the material (8) of the elastic sealing means is a cement on the basis of latex.

3. The pipeline as defined in claim 1, wherein said covering (5) is made of prefabricated sleeves (6), separated from one another by elastic sealing joints (10a, 10b) which are resistant against the temperature of the fluid.

* * * * *